United States Patent [19]
Agazzi et al.

[11] Patent Number: 5,353,309
[45] Date of Patent: Oct. 4, 1994

[54] ISDN TRANSMITTER

[75] Inventors: Oscar E. Agazzi, Florham Park, N.J.; Steven R. Norsworthy, Emmanus, Pa.

[73] Assignee: AT&T Bell Laboratories, Murray Hill, N.J.

[21] Appl. No.: 877,902

[22] Filed: May 1, 1992

[51] Int. Cl.$^5$ .................................. H04B 14/06
[52] U.S. Cl. .................................. 375/59; 375/28; 341/77; 341/143
[58] Field of Search .................. 375/25, 27, 28, 59; 341/77, 143, 61, 122; 358/135

[56] References Cited

U.S. PATENT DOCUMENTS

| | | | |
|---|---|---|---|
| 4,896,335 | 1/1990 | Wong et al. | 375/59 |
| 4,901,077 | 2/1990 | Christopher | 341/143 |
| 4,995,031 | 2/1991 | Aly et al. | 370/32.1 |
| 4,999,830 | 3/1991 | Agazzi et al. | 370/32.1 |
| 5,144,308 | 9/1992 | Norsworthy | 341/143 |
| 5,208,594 | 5/1993 | Yamazaki | 341/143 |

OTHER PUBLICATIONS

*IEEE*, ISSCC, "An ANSI Standard ISDN Transceiver Chip Set," by H. Khorramabadi et al., Feb. 17, 1989, pp. 256, 257, 357.

*IEEE*, Journal of Solid State Circuits, vol. SC-22, No. 6, Dec. 1987, "A Single-Chip U-Interface Transceiver for ISDN," by D. Sallaerts et al., pp. 1-11-1021.

*IEEE*, Journal of Solid State Circuits, vol. 24, No. 6, Dec. 1989, "A Single-Chip 2B1Q U-Interface Transceiver," by R. Colbeck et al., pp. 1614-1624.

Primary Examiner—Stephen Chin
Assistant Examiner—T. Ghebretinsae
Attorney, Agent, or Firm—Richard D. Laumann

[57] ABSTRACT

A transmitter suitable for ISDN use feeds the 2B1Q transmit signals directly into a sigma-delta modulator. The input word is two or three bits and the datapath within the sigma-delta modulator need be only six bits wide. The sigma-delta modulator has sample-hold means which has some filtering effect. The additional filtering requirements are met with an analog filter. No digital interpolation filter is required.

9 Claims, 2 Drawing Sheets

ISDN TRANSMITTER

TECHNICAL FIELD

This invention relates generally to the field of transmitters and particularly to transmitters useful with ISDN.

BACKGROUND OF THE INVENTION

Although optical communications over glass transmission lines, commonly termed optical fibers, are becoming increasingly important, electrical communications over pairs of wires have been important and will likely remain important for a long period of time. Although the bandwidth of wires is extremely limited as compared to the bandwidth of optical fibers, techniques have been developed which increase the information handling capabilities of wire pairs. One such technique is the Integrated Services Digital Network (ISDN) which uses sophisticated data processing techniques to allow data transmission over wire pairs at rates in excess of 100 kbits/sec. This is a remarkable accomplishment when it is considered that analog voice transmission over wires is limited to approximately 4 kHz; high quality audio equipment accurately reproduces signals to frequencies in excess of 20 kHz. Thus, ISDN offers possibilities of greatly increasing the capacity of already installed wires at modest additional cost. Access to and from the wires is provided by interfaces or stations which are transceivers; that is, they combine the functions of transmitters and receivers. To insure the ability of all stations connected to the wires to communicate with each other, the American National Standards Institute (ANSI) has adopted standards for output signals from the transmitter that all interfaces must satisfy. The ANSI standard for the U-interface also defines some aspects of the receiver.

These requirements include efficient conversion of a 2B1Q symbol into four precisely spaced analog levels and subsequent filtering of this four-level analog signal to create an output response which satisfies the ANSI standard. The ANSI standard specifies the accuracy of the four levels indirectly. The standard specifies only the required linearity; the mismatch among levels is a form of nonlinear distortion, and the permitted mismatch is thus specified indirectly. ISDN transceivers require a phase locked loop to perform the timing recovery function. Both analog and digital phase locked loops have been used in the past. For example, Khorramabadi et al. (Khorramabadi), *IEEE International Solid States Circuits Conference*, Feb. 17, 1989, pp. 256–357, describes a design that uses an analog phase locked loop. Sallaerts, et al. (Sallaerts) *IEEE Journal of Solid State Circuits*, Vol. 22, December 1987, pp. 1011–1021, and Colbeck, et al. (Colbeck) *IEEE Journal of Solid State Circuits*, Vol. 24, December 1989, pp. 1614–1624, describes designs that use digital phase locked loops. It was pointed out by D. D. Falconer (Falconer), *IEEE Transactions Communications*, Vol. COM-33, No. 8, "Timing Jitter Effects on Digital Subscriber Loop Echo Cancellers: Part I—Analysis of the Effect," August 1985, pp. 826–832, that the phase steps introduced by digital phase locked loops severely degrade the echo cancellation and, if not compensated, would cause the receiver to make a large number of decision errors.

Two techniques have been used to cope with this effect. One of them, called "the synchword approach," restricts the instants when phase steps can occur in such a way that they coincide with the reception of the synchronization word (or "synchword") specified by the ANSI standard. Since no data are being received during this period, the degradation of the echo cancellation can be tolerated. Unfortunately, this technique limits the full range of the phase locked loop. Moreover, it is very difficult to confine the degradation of the echo cancellation to the duration of the synchword and, as a result, there is some degradation of the performance of the receiver.

The second technique is the "jitter compensation technique," originally proposed by R. B. P. Carpenter, S. A. Cox, and P. F. Adams: "Jitter Compensation in Echo Cancellers," presented at the *IASTED International Symposium for Applied Signal Processing and Digital Filtering*, Jun. 19–21, 1985, and by D. G. Messerschmitt: "Asynchronous and Timing Jitter Insensitive Data Echo Cancellation," presented at the *IEEE Transactions on Communications*, Vol. COM-39, December 1987, pp. 1209–1217. In this technique, an adaptive transversal filter is used to estimate the effect of phase steps on echo cancellation and to generate a compensation signal, which is subtracted from the received signal at the instants when phase steps are generated. This technique has a superior performance and allows a large number of phase steps to be generated without degradation, resulting in a wide pull range for the timing recovery subsystem. However, in order for this technique to perform properly, it is desirable to preserve the time invariance of the echo path. The time invariance requirement for the echo path could easily be violated by an improper design of the transmitter. It is therefore important to provide a transmitter design that preserves this time invariance. Of course, in addition to the technical requirements just mentioned, implementations should use minimal silicon surface area and have minimal power dissipation to enhance prospects of commercial success. Many attempts have been made to implement transmitters satisfying such requirements.

For example, Sallaens describes a transmitter using pulse-density modulation (PDM) and a 1-bit digital to analog (D/A) converter. The pulse-density modulation is not accomplished with sigma-delta modulation but with a sequence stored in ROM (read-only memory). This approach has the drawback that it produces a discontinuity at the transition between two consecutive 2B1Q pulses and that it is sensitive to phase steps. Sigma-delta modulation is a more desirable approach to generating a pulse density modulated signal because it avoids the two drawbacks mentioned above. Colbeck describes a technique for achieving time invariance of the transmitted pulses in spite of phase steps. The technique uses two parallel switched capacitor filters. This technique has the drawback of requiting that the characteristics of the two filters be very closely matched. This requirement is often difficult to satisfy. Khorramabadi describes a transceiver using a second order analog Butterworth filter. The four analog levels must be matched to approximately 14–15 bit relative level accuracy. An alternative approach, using over sampling sigma-delta D/A conversion, could be used to alleviate the linearity or level sensing problem but would require a complicated digital interpolation filter. The filter will require several thousand gates to implement, and the digital modulator will require a datapath at least 20 bits wide.

A transmitter which uses sigma-delta modulation and has low power dissipation, conforms to the ANSI standard, uses a relatively small silicon area, and has a substantially time invariant transmit path would be desirable.

SUMMARY OF THE INVENTION

A transmitter, suitable for use with ISDN, has an encoder for receiving an incoming digital data stream at a first clock rate and converting it into digital pulse code modulation (PCM) levels, such as a two-bit 1 quaternary (2B1Q) data stream, at a second clock rate, a transmit clock, connected to the encoder, which has means for adjusting the phase of the data stream, a sigma-delta modulator which receives the data stream from the encoder, and a low pass filter. In a preferred embodiment, the low pass filter comprises means for sample-hold at a second clock rate connected to the sigma-delta modulator and a low pass analog filter which receives the output from the sigma-delta modulator.

The sigma-delta modulator is controlled by a free-running clock at a third-clock rate. The filtering is performed by both the means for sample-hold and the low pass analog filter. There is no digital interpolation filter between the encoder and the sigma-delta modulator. The input word need be only three bits wide in order to represent the four levels of the 2B1Q code and, in addition, the zero level. In order to prevent overflow, the modulator datapath needs to be somewhat wider than is the input word. Simulation and laboratory experiments show that only 6 bits are sufficient. The clock for the encoder is controlled by a digital phase-locked loop, and it therefore experiences phase steps. However, the clock for the sigma-delta modulator must be free running in order to preserve the time invariance of the echo path. This is a condition for the jitter compensation technique to perform properly. Thus, the clock rates for the encoder and the sigma-delta modulator are independent. The clock rate for the encoder is controlled with a transmit clock at a second clock rate, whereas the clock rate for the sigma-delta modulator is not. The modulator uses a free-running clock, or a third clock rate. The phase of the transmitted signal changes in increments of the sampling periods of the sigma-delta modulator.

DETAILED DESCRIPTION

The invention will be described by reference to a particular embodiment. Variations of this embodiment as well as other embodiments will be apparent to those skilled in the art.

Figure 1:
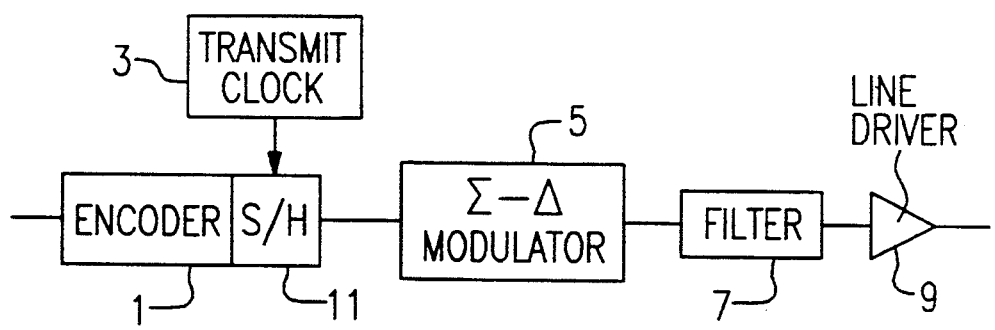
FIG. 1 is a schematic representation of an embodiment of a transmitter according to this invention.

FIG. 1 is a schematic representation of an embodiment of a transmitter according to this invention. Depicted are encoder 1, transmit clock 3, sigma-delta modulator 5, low pass filter 7, and line-driver 9. The encoder 1 has means for sample-hold 11. The sigma-delta modulator is controlled by a free-running clock at a third clock rate. Both the means for sample hold 11 and low pass filter 7 perform the required filtering. The means for sample hold 11 has a sinx/x filtering effect. It must be emphasized that there is no digital interpolation filter before the sigma-delta modulator. The transmit clock also has means for adjusting the phase of the data stream.

Encoder 1 receives the incoming digital data stream at a first rate and encodes the data into a 2B1Q data stream at a second rate. The second clock rate is half of the first clock rate. The first and second clock rates are always phase and frequency synchronous. An exemplary rate for the first data stream into the encoder is 160 kbits/sec. The sigma-delta modulator has a free-running clock, or a third clock rate. An exemplary third clock rate is 15.36 MHz. The 2B1Q signal has two data bits and one control bit. The data bits are encoded into four levels which are $\pm 1$, and $\pm 3$. There is also a 0 level which is to provide a space between consecutive pulses whose width depends on the presence or absence of phase steps. If there are no phase steps, the width of this space is one period of the third clock rate (free-running clock, or 15.36 MHz clock). The second and third clock rates are independent of each other, but the second clock rate is controlled by the digital phase locked loop and the third is free running. An exemplary rate for the 2B1Q signals from the encoder is 80 kbauds. For multi-level pulses, the data rate is measured in bauds. For the 2B1Q code, 1 baud is 2 bits/sec., but other codes may have a different relationship between bits and bauds.

The analog low pass filter is conventional and will be readily constructed by those skilled in the art. For example, a first order switched capacitor filter may be series connected to a first order passive RC low-pass filter. Of course, higher order filters may be used if desired.

Figure 2:
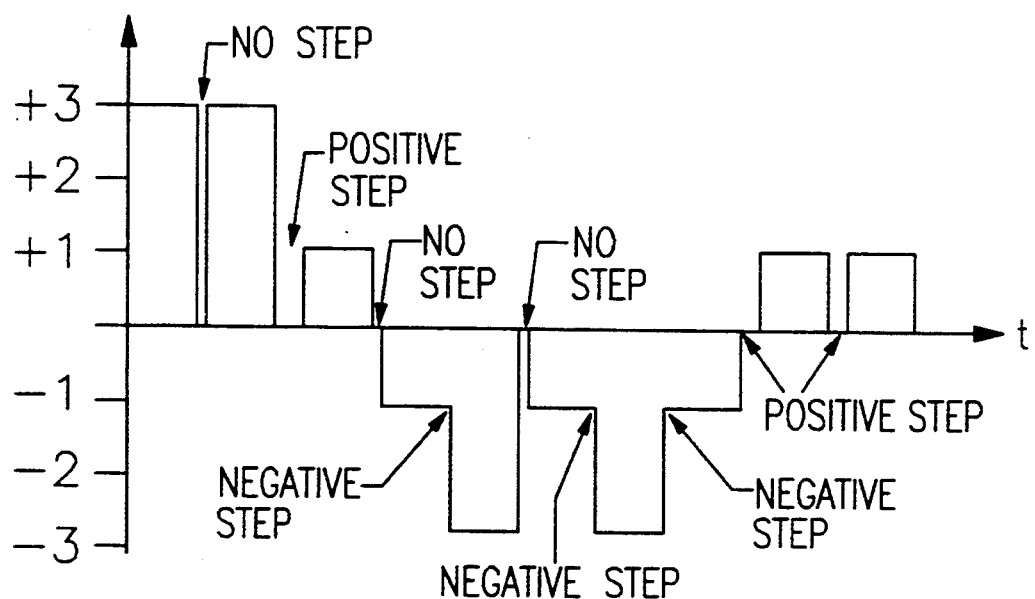
FIG. 2 is a representation of the 2B1Q signals at the input of the transmitter.

FIG. 2 depicts the 2B1Q signals at the input of the sigma-delta modulator. The amplitude is plotted vertically and time is plotted horizontally. As can be seen, the amplitude levels are $\pm 3$ and $\pm 1$. Additionally, there are phase steps between some pulses as shown. These phase steps may be either positive or negative as is apparent from consideration of the figure. If there is a positive phase step, its width is two periods of the same clock and, if there is a negative phase step, its width is zero. The definition of positive and negative is somewhat arbitrary; the definition could equally well reverse the terms. Whether the step is positive or negative is determined by a phase locked loop. The phase of the transmitted signal is controlled by controlling the phase of the 2B1Q signals at the input to the sigma-delta modulator. The signs of the phase steps are positive and negative when the phase lead is increased and decreased, respectively. For example, if the baud period is 192 machine cycles, the free running clock may be divided by 191 and 193 to increase and decrease, respectively, the phase lead. It should be emphasized that the pulses should maintain constant width in the presence of the phase steps so that the time invariance of the equivalent filter is preserved.

In more detail, the phase of the transmitted signal changes in increments of the sampling period of the transmitter. The maximum size of the phase step is limited in practice by the jitter specification of the ANSI standard to less than 0.01 bauds. A high sampling rate is desirably used in the embodiment minimizing the degradation of the echo cancellation when phases steps are generated and, therefore, simplify the design of the echo canceller. As previously mentioned, the phase of the transmitted signal is adjusted by controlling the phase of the 2B1Q pulses at the input of the modulator.

Figure 3:
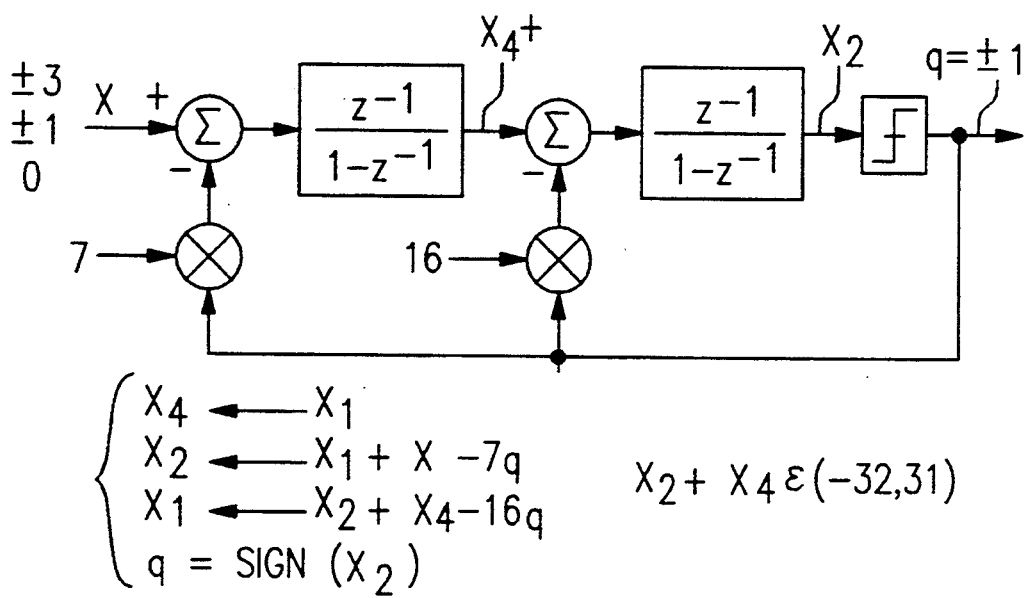
FIG. 3 is a schematic representation of a sigma-delta modulator useful in the transmitter.

FIG. 3 is a schematic representation of a sigma-delta modulator useful in the transmitter. The design is conventional and need not be described in detail, as an appropriate circuit will be readily implemented by those skilled in the art. The terminology used in the diagram is well known to those skilled in the art and need not be explained in detail. Of course, the values used in the feedback loops depend upon the input values; input values that differ from $\pm 1$ and $\pm 3$ will typically require different values in the feedback loops.

To preserve the time invariance of the echo path, the transmitter must be operated by a free running clock. Its frequency, at least in principle, can be lower than the maximum frequency available in the system. However, as already explained, the phase of the transmitted signal changes in increments of the sampling period of the transmitter, and therefore the maximum allowable phase step determines the required sampling rate of the transmitter. To keep the phase steps small, the transmitter is also sampled at a high rate. Implementing the transmitter with a sigma-delta modulator allows both low power operation and low distortion to be obtained despite the high sampling rate. To preserve the time invariance of the echo path, the input 2B1Q pulses maintain constant width in the presence of the phase-step pulses. This means that their width must be less than the nominal baud period and that zero must be treated as a valid level for the data signal.

It is apparent from the description that the transmitter feeds a data stream having only five levels directly into the sigma-delta modulator. This allows the sigma-delta modulator design to be greatly simplified because only very low resolution is required in its design. In general, a data signal having only a limited number of levels may be used as opposed to the normal case where the input signal is digital representation of an analog or continuous signal and must be represented by a large number of levels. For example, a 12-bit signal represents 4096 levels.

Figure 4:
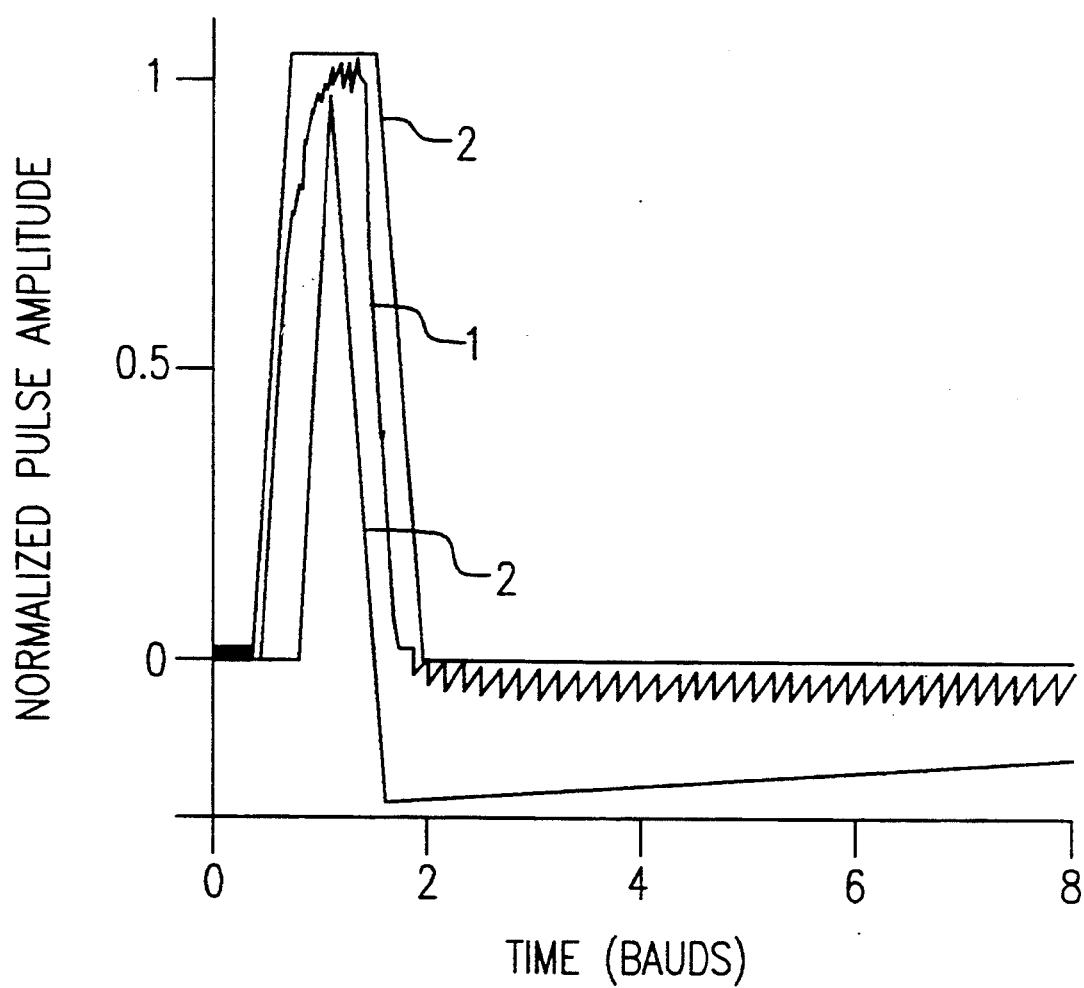
FIG. 4 shows the amplitude of a pulse generated by a transmitter according to this invention plotted vertically versus time horizontally and the limits specified by the ANSI standard.

FIG. 4 plots the amplitude of a pulse, shown as curve 1, from a transmitter vertically versus the time horizontally. The limits specified by the ANSI standard are also shown as curves 2. The pulse shape depicted is the shape after the analog low pass filter. Although only the case of nominal value of the continuous time pole is shown in FIG. 4, extreme cases for worst case process variations were also verified and found to satisfy the ANSI standard. There is residual quantization noise which is not completely removed by the low pass filter. This noise is later removed by the low pass filtering action of the transformer and therefore does not cause any degradation in performance.

The transmitter described consumes a minimal amount of chip area and has minimal power consumption.

Variations in the embodiment described will be apparent to those skilled in the art. For example, although the transmitter described conforms to the ANSI standard, benefits of the invention may also be obtained in transmitters that do not conform to the ANSI standard. Additionally, the rates of the data streams mentioned may be varied from those given. Furthermore, the levels used by the encoder may differ from those given. For example, digital data streams may be encoded into other codes, such as 3B2T rather than 2B1Q.

We claim:

1. A transmitter comprising:
    an encoder for receiving an incoming digital data stream at a first clock rate and converting it into digital PCM levels at a second clock rate;
    a transmit clock which is connected to the encoder and comprises means for adjusting the phase of the data stream;
    a sigma-delta modulator which receives the data stream from the encoder and operates at a third clock rate; and
    a filter, said filter comprising means for sample-hold at a third-clock rate connected to said modulator, and an analog filter which receives the output from said sigma-delta modulator.

2. A transmitter as recited in claim 1 in which said digital PCM levels comprise a 2B1Q data stream.

3. A transmitter as recited in claim 1 in which said second clock rate and said third clock rate are independent.

4. A transmitter as recited in claim 1 further comprising means for changing the phase of the data stream in increments of the sampling period of the sigma-delta modulator.

5. A transmitter as recited in claim 4 in which said analog filter comprises a series connected first order switched capacitor filter and a first order passive RC filter.

6. A device comprising:
    means for receiving a digital data stream and encoding it into digital pulse code modulated levels;
    means for adjusting the phase of said digital pulse code modulated levels;
    sample-hold means for receiving said phase-adjusted digital pulse code modulated levels;
    sigma-delta modulator for receiving the signal from said sample-hold means and encoding said signal into a 1-bit data stream; and
    a low pass filter for said 1-bit data stream.

7. A device as recited in claim 6 in which said digital pulse code modulated levels comprise 2B1Q levels.

8. A device as recited in claim 6 further comprising a free-running clock for said sigma-delta modulator.

9. A device as recited in claim 6 in which said low pass filter comprises an analog filter comprising a series connected first order switched capacitor filter and a first order passive RC filter.

* * * * *